United States Patent [19]

Deming

[11] 4,173,026
[45] Oct. 30, 1979

[54] SELF CLOCKING SPEED TOLERANT MAGNETIC RECORDING METHOD AND APPARATUS

[75] Inventor: Chandler R. Deming, San Diego, Calif.

[73] Assignee: Cubic Western Data, San Diego, Calif.

[21] Appl. No.: 880,330

[22] Filed: Feb. 23, 1978

[51] Int. Cl.² ............................................. G11B 5/09
[52] U.S. Cl. ..................... 360/44; 235/482; 235/493
[58] Field of Search .............. 360/2, 51, 44; 235/482, 235/493

[56] References Cited

U.S. PATENT DOCUMENTS

| | | | |
|---|---|---|---|
| 3,737,632 | 6/1973 | Barnes | 360/2 |
| 3,864,754 | 2/1975 | Miklos et al. | 360/51 |
| 3,959,816 | 5/1976 | Spiecens | 360/44 |
| 4,032,915 | 6/1977 | Shanks et al. | 360/44 |

Primary Examiner—Vincent P. Canney
Attorney, Agent, or Firm—Brown & Martin

[57] ABSTRACT

In the disclosed method, pre-recorded bit markers are read from a magnetic medium as it is moved by hand at a highly variable speed past a magnetic read head. Pulses of a fixed frequency are counted between the reading of adjacent ones of the bit markers. Magnetic flux is written in one direction on the medium upon the reading of the bit markers; and magnetic flux is written in an opposite direction after a time period equal to a fraction of the number of pulses counted between bit markers times the reciprocal of the fixed frequency. Also disclosed is apparatus for performing the steps of the disclosed method.

5 Claims, 5 Drawing Figures

SELF CLOCKING SPEED TOLERANT MAGNETIC RECORDING METHOD AND APPARATUS

BACKGROUND OF THE INVENTION

The disclosed invention relates to methods and apparatus for writing binary information on magnetic media at a predetermined bit density, and more particularly to methods and apparatus for writing the information while the media is moving at a highly variable speed. Suitably, the disclosed invention may be utilized, for example, in a mass transit system for writing information on fare cards. Typically, these fare cards include a magnetic strip on which are recorded information necessary for the operation of the system. Included within this information may be items such as the cost of the ticket, or the area of the city in which the ticket can be used. In operation, the ticket is placed in a ticket reading apparatus by a passenger prior to boarding. The apparatus reads the ticket, determines based on the information contained therein whether or not boarding is to be allowed, and then writes updated information on the ticket.

In the past, tickets were read by transporting them via a servomechanism past read heads and write heads at a predetermined fixed speed. Since the speed was fixed, timing signals for controlling the instants at which the updated information (in the form of magnetic flux changes) were to be written onto the ticket were derived from a fixed frequency oscillator. That is, in the prior art systems, the time interval between the writing of successive bits, as well as the time instant at which magnetic flux changes occurred within a bit to indicate the presence of a 1 or a 0 was fixed in accordance with the predetermined speed at which a servomechanism moved the cards. One problem with these prior art systems is that they require the incorporation of servomechanism circuitry for transporting the cards. It is of course desirable to eliminate this circuitry so as to reduce the cost of the system. To this end, other prior art mass transit systems eliminate the servomechanism by reading the information on the ticket as it is moved by hand past read heads and write heads. But these systems include tachometers to sense the speed of the ticket in order that timing signals can be generated for writing updated information back onto the ticket. A problem, of course, with these tachometers is that besides being a cost factor, they have moving parts which regularly wear out and require maintenance.

Accordingly, it is one object of the invention to provide an improved method for writing information on a magnetic card which is moving at a highly variable speed.

Another object of the invention is to provide improved apparatus for writing information on a magnetic card which is moving at a highly variable speed.

Another object of the invention is to provide apparatus having no moving parts for writing information on a magnetic card which is moving at a highly variable speed.

Still another object of the invention is to provide apparatus for reading magnetically recorded information from one portion of a card which is traveling at a highly variable speed and for simultaneously writing information to a second portion of the card.

SUMMARY OF THE INVENTION

These and other objectives are accomplished in accordance with the invention by a method comprised of the steps of reading pre-recorded magnetic bit markers from a card as it is passed by hand under a read head and write head; counting pulses of a fixed frequency between the reading of adjacent ones of the bit markers; writing magnetic flux in one direction on the card upon the detection of each of the bit markers; and writing magnetic flux in another direction opposite to the one direction at a time instant determined by the number of pulses counted between adjacent ones of the bit markers. The disclosed apparatus includes reading means for reading pre-recorded ones of the bit markers on the card and for generating first logic signals indicating the detection of the bit markers. The apparatus also includes counting means for counting electronic clock pulses of a fixed frequency in response to second logic signals. Further included are writing means for selectively writing magnetic flux in one direction or in an opposite direction in response to third and fourth logic signals. Logical control means, such as a microprocessor, couples to the reading means for receiving the first logic signals, couples to the counting means for initiating the counting in response to the first logic signals and for receiving counts therefrom indicating the number of pulses occurring between adjacent initiations, and couples to the writing means for generating the third and fourth logic signals in response to the first logic signals and the counts received from the counting means.

BRIEF DESCRIPTION OF THE DRAWINGS

The novel features believed characteristic of the invention are set forth in the appended claims. The invention itself, however, as well as other features and advantages thereof will best be understood by reference to the following detailed description of particular embodiments when read in conjunction with the accompanying drawings, wherein:

DETAILED DESCRIPTION OF THE DRAWINGS

Figure 1:
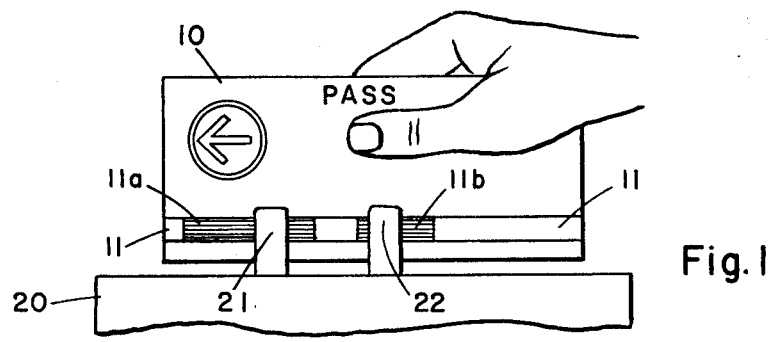
FIG. 1 is a pictorial drawing of a system wherein the disclosed method is performed.

FIG. 1 is a pictorial diagram of a system wherein the steps of the disclosed invention are performed. The system includes a hand held card 10 having a single magnetic track 11 disposed thereon. Card 10 may be of any convenient size and in one preferred embodiment is approximately 2½ inches by 3½ inches. Similarly, magnetic strip 11 may be of a variety of sizes, and in one preferred embodiment strip 11 is approximately ¼ inch wide and runs the entire length of card 10. Also included in the system of FIG. 1, is a device 20 for magnetically recording bits of information on magnetic track 11. To perform this operation, device 20 includes a read head 21 and a write head 22. In operation, recording is performed while card 10 is moved by hand past magnetic read head 21 and write head 22. The system may also include card guides (not shown) for channeling card 10 such that track 11 passes directly under heads 21 and 22.

Since card 10 is moved by hand rather than by a servomechanism, it follows that the speed at which track 11 passes under heads 21, 22 is highly variable. For example, the time required for one bit of information to pass under head 21 may be as short as 0.8 milliseconds and as long as 20 milliseconds. Under these variable conditions, device 20 operates to record information at a predetermined fixed bit density on track 11. To this end, device 20 utlizes head 21 to read prerecorded magnetic bit markers on a portion 11a of track 11. These bit markers will be described shortly in conjunction with FIG. 2. As the bit markers are read, device 20 also counts pulses of a fixed frequency between the reading of adjacent ones of the bit markers. Suitably, pulses of 400 KHz may be counted. Device 20 utilizes the pulse count as an indicator of the speed at which track 11 is passing under heads 21 and 22. In general, a relatively large count indicates a slow velocity, whereas a relatively short count indicates a high velocity. Based on this velocity information, device 20 utilizes write head 22 to magnetically record information in a portion 11b of track 11 at the predetermined bit density.

Figure 2:
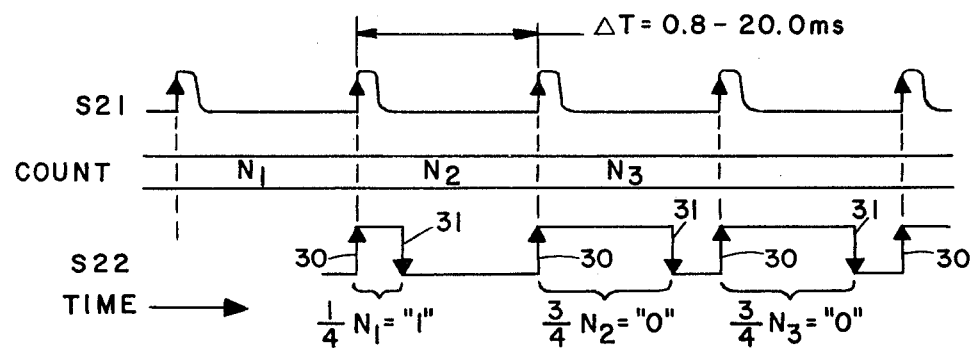
FIG. 2 is a timing diagram illustrating the execution of the steps of the disclosed method.

With reference to FIG. 2, a preferred format for the magnetically recorded information in portion 11b of track 11 will now be described. In this format, magnetic flux is written in one direction 30 on portion 11b in response to the reading of each of the bit markers in portion 11a. Conversely, at some time instance between the reading of each of the bit markers from portion 11a, magnetic flux is written on portion 11b in another direction 31 opposite to direction 30. The exact instants at which flux writing changes from direction 30 to direction 31 is dependent upon the number of pulses which were counted between adjacent ones of the bit markers from portion 11a. In particular, a logical "1" bit of information is recorded by changing the magnetic flux from direction 30 to direction 31 after ¼ times the number of pulses counted between the preceeding adjacent bit markers from portion 11a. Similarly, a logical "0" bit is recorded by changing the magnetic flux from direction 30 to direction 31 after ¾ times the number of pulses counted between the preceeding adjacent bit markers from postion 11a. This data format and the timing for writing it is indicated in FIG. 2 via signals S21, CNT, and S22. Signal S21 represents bit marker signals detected by head 21, signal CNT represents the number of pulses counted (N1, N2, . . . ) between adjacent bit markers, and signal S22 represents the write currents in head 22.

Figure 3:
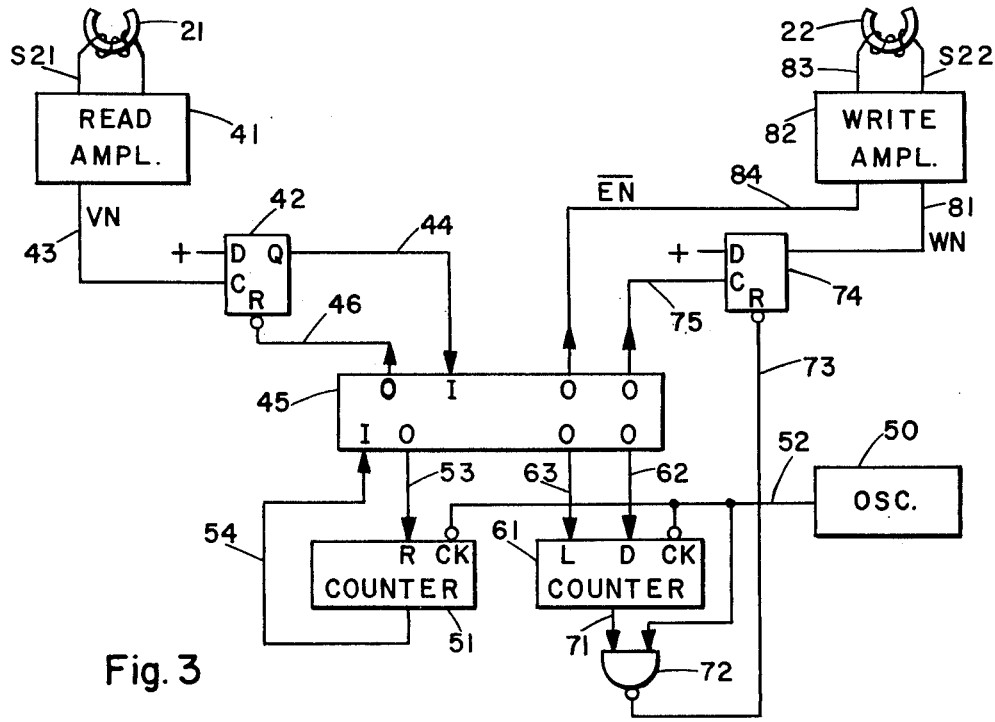
FIG. 3 is a logic diagram of apparatus for performing the steps of FIG. 2.
Figure 4:
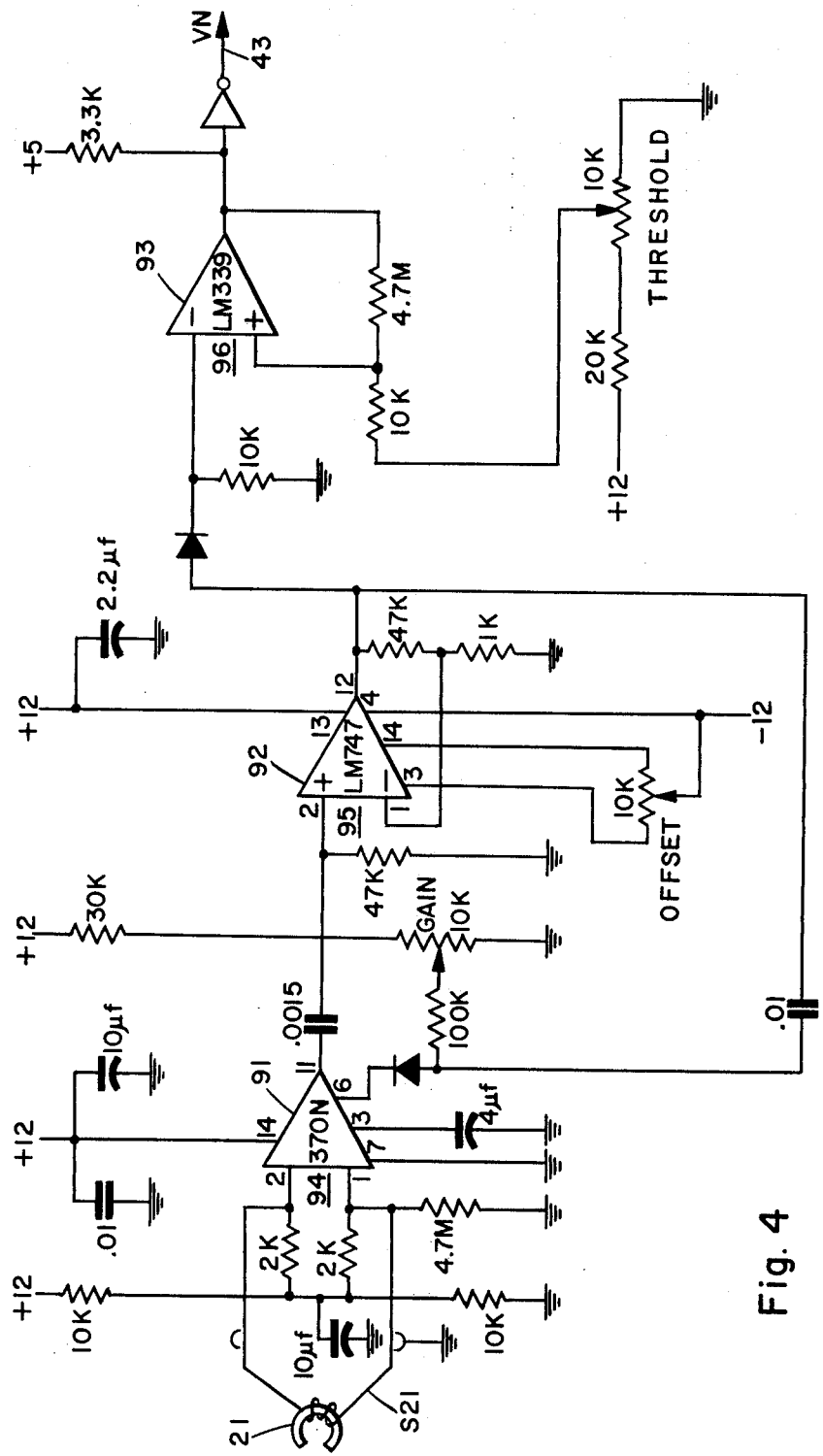
FIG. 4 is a detail circuit diagram of a read amplifier within the circuit of FIG. 3.

Referring now to FIG. 3, there is illustrated a logic diagram of the circuits included within the device 20 which perform the above described steps. These circuits include an analog amplifier 41 having inputs coupled to receive signals S21 from head 21. Amplifier 41 operates to increase the magnitude of the signal S21 to suitable logic levels such as zero volts and +5 volts. Details of the circuitry included within amplifier 41 are illustrated in FIG. 4. A flip-flop 42 has a clocking input C coupled to an output of amplifier 41 via a lead 43. Flip-flop 42 is a D-type triggerable flip-flop, and may be a 7474 as an example. Signal transistion on lead 43 from a logical low to a logical high indicates that head 21 has detected a bit marker. In response to this low to high transistion, flip-flop 42 latches its Q output in a high state. A lead 44 couples the Q output to a microprocessor 45. In one specific implementation, processor 45 is an Intel 8048 chip. In operation, processor 45 periodically samples signals on lead 44 to determine whether or not a bit marker has been sensed by head 21. Processor 45 also has an output coupled via lead 46 to a reset input R on flip-flop 42, which provides a means for processor 45 to clear signals on lead 44 after it detects the signals.

Device 20 further includes an oscillator 50, and a digital counter 51. Oscillator 50 is conventional in its detailed structure, and may be either crystal controlled or R-C controlled. In one preferred specific embodiment, oscillator 50 generates continuous 400 KHz digital pulses on an output lead 52. Lead 52 couples to a clocking input on counter 51 which in one preferred embodiment is a 16 bit counter comprised of serially connected 74168 chips. In response to the clocking signals on lead 53, counter 51 counts up at a 400 KHz rate. A lead 53 couples an output of processor 45 to a reset input on counter 51 to provide a means whereby processor 45 may initialize counter 51 to a known value. Processor 45 performs this initialization in response to the detection of a bit mark signal on lead 44. The output of counter 51 couples via leads 54 to inputs on processor 45. Accordingly, leads 54 provided a means whereby processor 45 may sense the number of pulses which occurred on leads 52 between the detection of successive bit markers by head 21. Specifically in operation, processor 45 detects bit marker signals on lead 44, subsequently initializes counter 51, and subsequently reads the count from counter 51 after the detection of the next bit marker signal on lead 44.

Device 20 also includes a second counter 61 having a clocking input coupled to receive the 400 KHz pulses on leads 52. Counter 61 is a 16 bit down counter and is implemented with 74168 chips. Data outputs of processor 45 are coupled via leads 62 to data inputs of counter 61. Another output of processor 45 couples via leads 63 to the load input on counter 61. Thus, leads 62 and 63 provide a means whereby processor 45 may load counter 62 with any desired count. In operation, the number loaded into counter 61 equals either ¼ or ¾ times the number previously read from counter 51. The smaller number is loaded into counter 61 when a "1" bit is to be written; whereas the larger number is loaded into counter 61 whenever a "0" bit is to be written.

The carry out signal of counter 61 couples via a lead 71 to a logical NAND gate 72. Lead 52 also couples to an input on gate 72. Accordingly, gate 72 generates a synchronized output pulse indicating when counter 61 has counted down to zero. This output pulse is coupled via a lead 73 to a reset input on a triggerable D flip-flop 74. This flip-flop may suitably be a 7474 chip. Processor 45 has an output coupled via a lead 75 to a clocking input of flip-flop 74. In operation, processor 45 generates signals on leads 75 to set flip-flop 74; while zero detect circuit 72 generates signals on leads 73 to reset flip-flop 74. The time lapse which occurs between the set signals on lead 75 and the reset signals on lead 73 is determined by the count which is set by processor 45 into counter 61 and by the frequency of clocking signals on leads 52. Accordingly, circuits 61, 72, and 74 provide a means whereby processor 45 controls the set and reset time of flip-flop 74 in response to the variable count, and in particular, to the variable count detected from counter 51.

Flip-flop 74 has a Q output which couples via a lead 81 to a write amplifier 82. An output of amplifier 82 couples to write head 22 via leads 83. Signals S22 on leads 83 are generated in response to the logical state of signals on lead 81. In particular, signals S22 generate magnetic flux in head 22 in one direction in response to a high logical signal on lead 81; and generate flux in another direction in response to signals in a logical low state on leads 81. Amplifier 82 also has an enable input coupled via leads 84 to an output or processor 45. Signals $\overline{EN}$ on leads 84 enable the operation of amplifier 82 when they are at a low logic level.

To briefly summarize, the overall operation of the circuit of FIG. 3 is as follows. Head 21 generates signals S21 indicating the detection of prerecorded magnetic bit markers in portion 11a of magnetic strip 11. Signals S21 are increased in amplitude by amplifier 41 to logic signals; and these logic signals set flip-flop 42. Microprocessor 45 periodically senses lead 44 to detect the presence of the bit markers. Upon the detection of a bit marker, processor 45 reads the value stored in counter 51 via leads 54 and subsequently resets counter 51 via signals on leads 53. The count read from counter 51 is operated on by processor 45, and the result is stored in counter 61 via leads 62 and 63. Specifically processor 45 loads ¼ of the count read from counter 51 into counter 61 when a one bit is to be written via write head 22; and loads ¾ of the count which was read from counter 51 into counter 61 when a zero bit is to be written by write head 22. Prior to loading this count into counter 61, processor 45 sets flip-flop 74 via signals on leads 75. Flip-flop 74 is subsequently reset via signals on leads 73 when counter 61 counts down to zero. During the time that flip-flop 74 is set, amplifier 82 generates signals S22; and in response thereto, write head 22 writes magnetic flux in one direction on portion 11b of magnetic strip 11. Conversely, when flip-flop 74 is reset, amplifier 82 generates signals S22 such that write head 22 writes magnetic flux in another direction opposite to the one direction on portion 11b of magnetic strip 11.

Referring now to FIG. 4, one preferred embodiment for amplifier 41 will be described. Basically, amplifier 41 includes operational amplifiers 91 and 92, and comparator 93. Resistor-capacitor input and bias circuits 94, 95 and 96 respectively couple to circuits 91, 92 and 93 in the manner illustrated in FIG. 4. In operation, signals S21 are fed to amplifier 91 through RC circuit 94 where they are amplified by a gain of approximately 40 dB. The output of amplifier 91 A-C couples to the input of amplifier 92, and the output of amplifier 92 D-C couples to the input of comparator 93. The illustrated combination provides a gain sufficient to convert the small positive pulses of signal S21 to a logical high level pulse on lead 43.

Figure 5:
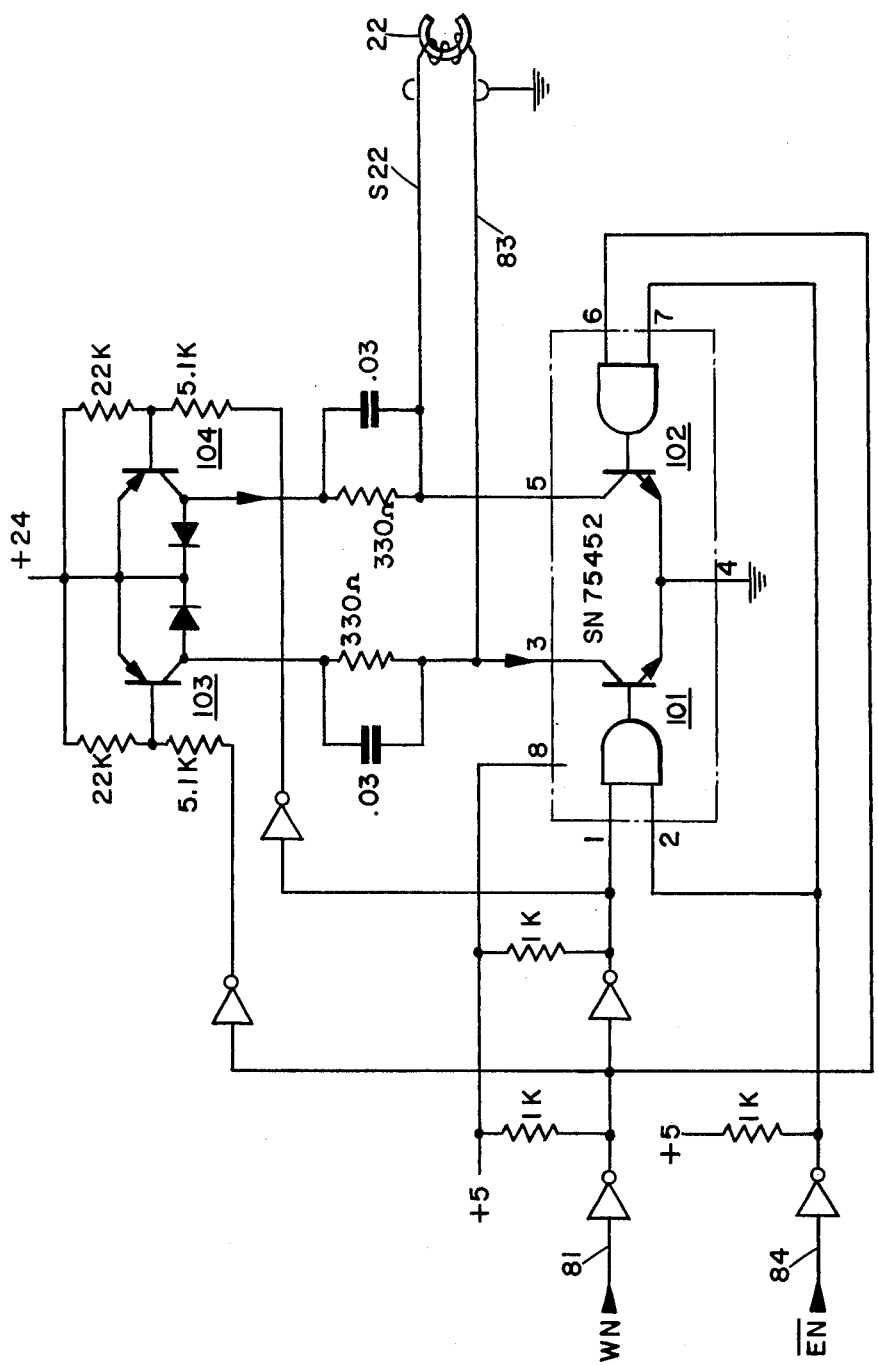
FIG. 5 is a detailed circuit diagram of a write amplifier within the circuit of FIG. 3.

FIG. 5 is a detailed circuit diagram of one preferred embodiment for write amplifier 82. This particular write amplifier includes a pair of logically controlled transistors 101 and 102 each of which have one logical control input coupled to receive the $\overline{EN}$ signal on lead 84. A second logical control input on transistor 101 is enabled in response to signal WN on lead 81 being a logical high; while a second logical control input on transistor 102 is enabled in response to signal WN being a logical low. Write amplifier 82 also includes a pair of logically controlled transistors 103 and 104. Transistor 103 is activated in response to signal WN being a logical high; while transistor 104 is activated in response to signal WN being a logical low. Transistors 103 and 104 supply current via leads 83 to write head 22; and this current is selectively sinked via transistors 101 and 102. Specifically, current passes through write head 22 in one direction when signal WN is a logical high; and passes through write head 22 in an opposite direction when signal WN is a logical low. Also, no current flows through write head 22 when signal $\overline{EN}$ is a logical high.

Various embodiments of the invention have now been described in detail. In addition, however, several modifications to these details may be made without departing from the nature and spirit of the invention. For example, with reference to FIG. 3, microprocessor 45 may be replaced in whole or in part with hardwired combinational logic. For example, counter 51 could have its output coupled to the input of counter 61 through combinational logic which selects either ¼ or ¾ the number in counter 51 dependent upon logical signals from processor 45.

With reference to FIG. 2, another modification within the scope of the invention is to include information bits interspaced between the bit markers in signal S21. That is, portion 11a of track 11 may include prerecorded fixed data in the form of the data which is recorded in portion 11b. In one preferred embodiment, portion 11a includes 48 bits of fixed data. This data includes items such as a serial number identifying the card type, a zone identifying a geographical area in which the card may be used, and a number identifying a maximum dollar value of the card. Therefore, since many changes and modifications can be made to the above described details without departing from the nature and spirit of the invention, it is to be understood that the invention is not to be limited to said details but is defined by the scope of the appended claims.

Having described my invention, I now claim:

1. Apparatus for magnetically recording information bits at a predetermined uniform spacing on a card such as a credit card or the like as it is moved by hand past said apparatus; said card having a plurality of magnetic bit markers prerecorded thereon at said uniform spacing and having a track for magnetically storing said information bits thereon; said apparatus being comprised of;

clocking means for generating clock pulses of a predetermined frequency;

first counting means responsive to a first control signal to enter an initial state and thereafter count said clock pulses;

second counting means responsive to a second control signal to load a selectable number and thereafter generate a reset signal indicating when said selectable number of said clock pulses have occurred;

first flip-flop means for resetting in response to said reset signal, and for setting in response to a third control signal;

read head means for generating a voltage pulse whenever any one of said bit markers lies thereunder as said card is moved by hand past said read head;

second flip-flop means for setting in response to said voltage pulse, and resetting in response to a fourth control signal;

control means responsive to the setting of said second flip-flop for generating all of said control signals and said selectable number as a fraction of the count in said first counter, said fraction being of a first or second value dependent upon whether a "1" bit or a "0" bit is to be written on said track; and writing means for writing magnetic flux on said track in one direction in response to said second flip-flop being set, and for writing said flux in an opposite direction in response to said second flip-flop being reset.

2. Apparatus according to claim 1, wherein said control means is a digital microprocessor.

3. Apparatus according to claim 2, wherein said first counting means is a digital count-up counter.

4. Apparatus according to claim 3, wherein said second counting means is a digital count-down counter having data inputs coupled to receive said selectable number from said digital count-up counter.

5. Apparatus according to claim 4 wherein said count-down counter is coupled to receive said selectable number from said count-up counter through said digital microprocessor.

* * * * *